April 1, 1958 M. A. KREITCHMAN 2,828,937
VALVE ASSEMBLY
Filed Sept. 1, 1955 2 Sheets-Sheet 1

INVENTOR.
MORTON A. KREITCHMAN
BY
Albert Sperry
ATTORNEY

2,828,937

VALVE ASSEMBLY

Morton A. Kreitchman, West Orange, N. J., assignor to Valcor Engineering Corporation, Kenilworth, N. J., a corporation of New Jersey Application September 1, 1955, Serial No. 531,951

5 Claims. (Cl. 251—129)

This invention relates to valves and is directed particularly to constructions adapted to control the flow of fluids in systems requiring the highest standards of cleanliness and sanitation.

There are many systems, such as those used in the handling of milk and other beverages, wherein the lines and passages through which the fluids flow must be constructed so as to be free of joints, crevices or zones wherein sediment or accumulations which might collect and promote the growth of bacteria or fungi. Thus, some sanitary codes applicable to the milk industry require all elements exposed to the milk to be free of any internally exposed threads. Moreover, all elements of any valve means which come into contact with the fluid in such systems must be capable of being heated or sterilized for purposes of cleaning. As a result the limitations imposed on such valves and their connections are very severe and present difficult problems of construction.

In accordance with the present invention, a new type of valve is provided which is simple and economical to produce and yet complies with the exacting conditions presented in the handling of fluids such as milk. These results are preferably attained by providing a valve body with one or more valve seat members which extend to the exterior of the body and are provided with external means for attachment to the lines or piping of the system. The valve further includes a valve member movable in a closed chamber into and out of engagement with the valve seat. The valve seat and valve member are removable from the body for cleaning or sterilization thereof without requiring disassembly or removal of the valve actuating means.

One of the objects of the invention is to provide a novel type of valve assembly adapted to be readily assembled and disassembled for frequent cleaning.

Another object of the invention is to provide a valve body with a removable valve seat extending to the exterior of the body for connection directly with lines or piping of a fluid system.

A specific object of the invention is to provide a valve for use in controlling the flow of milk or other beverages and constructed so as to present no internally exposed crevices or threads wherein material may accumulate to contaminate the fluid being controlled.

These and other objects and features of the invention will appear from the following description thereof in which references are made to the figures of the accompanying drawing.

Figure 1:
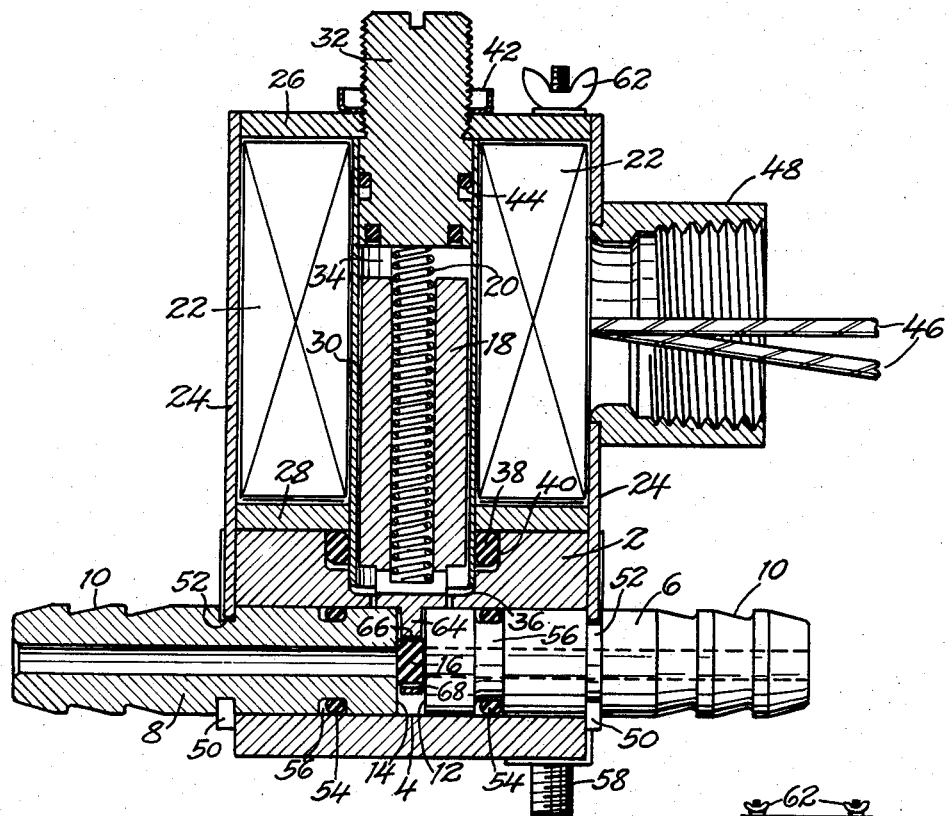
Fig. 1 is a vertical sectional view through a typical form of valve embodying the present invention.
Figure 3:
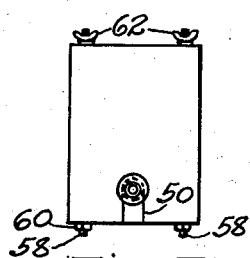
Fig. 3 is a side elevation of the valve illustrated in Fig. 1.
Figure 2:
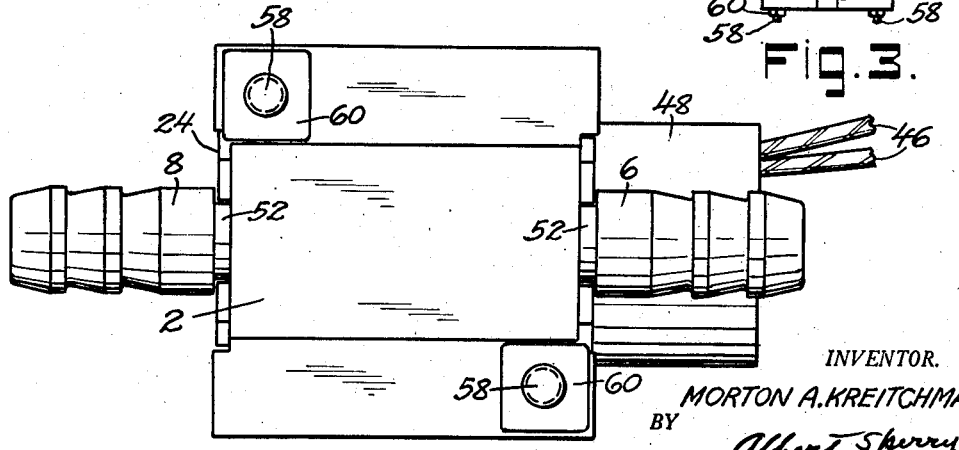
Fig. 2 is a bottom view of the valve construction illustrated in Fig. 1.

In that form of the invention chosen for purposes of illustration in Figs. 1, 2 and 3 of the drawing, the valve comprises a body 2 which is preferably formed of "Lucite" or other transparent material which serves to enable the condition and operation of the valve to be readily observed at all times. The body 2 is provided with a bore 4 extending therethrough and designed to receive valve seat members 6 and 8 which are arranged in axial alignment. The members 6 and 8 preferably are generally cylindrical in form and have a close sliding fit within the bore 4 of the valve body 2. Connecting portions 10 of the members 6 and 8 project outwardly beyond the body 2 and are formed on the exterior thereof with corrugations or other means for receiving plastic or rubber tubing. However, the connecting portions may be externally threaded or otherwise formed for connection with the lines through which the fluid to be controlled is passed.

The valve seat member 6 serves as an inlet member and is provided with an enlarged head presenting a flat valve seat 12, whereas the valve seat member 8 serves as an outlet member and is provided with a similar enlarged head presenting a flat valve seat 14 spaced from the valve seat 12 and positioned parallel thereto. A valve member 16 is carried by a plunger 18 and is movable into and out of position to engage the valve seats 12 and 14. The plunger 18 is urged toward a lower valve closing position by actuating means, such as the solenoid 22.

Solenoid 22 forms a part of a valve actuating unit housed within a shell 24, having an upper closure plate 26 and a lower closure plate 28. A sleeve 30 extends from the plate 26 to the plate 28 and cooperates withi the core member 32 to form a closed chamber 34 within which the plunger 18 is movable. The sleeve 30 projects below the plate 28 and into the recess 36 in the valve body 2. An O-ring 38 surrounds the downwardly projecting portion of the sleeve 38 and bears against the side walls of a counterbore 40 which communicates with the bore 4 at right angles thereto. The space between the sleeve 30 and valve body 2 are thus effectively sealed.

The core 32 of the solenoid is preferably threaded into the upper plate 26 of the solenoid housing and is held in adjusted position by a lock nut 42. An O-ring 44 is located between the core 32 and the inner surface of sleeve 30 so as to seal the space therebetween. The electrical leads 46 for supplying current to the solenoid 22 pass through the duct or pipe connection 48 secured to the shell 24 of the solenoid housing.

In the construction shown in Figs. 1, 2 and 3, the shell 24 of the solenoid housing is provided with retaining means for securing the valve seat members 6. Thus, the lower portion of the shell 24 projects downwardly below the plate 28 and is formed with oppositely disposed U-shaped slots 50 which extend upward from the lower edge of the shell. The connecting portions 10 of the valve seat members 6 and 8 are formed with annular grooves 52 which are embraced by the sides of the slots 50 when the body 2 and shell 24 are assembled as shown in Fig. 3. In this way, the members 6 and 8 are held against axial displacement within the bore 4 of the valve body 2. O-rings 54 are located in annular grooves 56 in members 6 and 8 to seal the space between the latter members and the valve body 2.

The whole assembly is preferably secured together by clamping means, such as the bolts 58 which extend through the solenoid housing adjacent the corners thereof and through the valve body 2. Nuts 60 engage the lower ends of the bolts 58, whereas wing nuts 62 may be secured to the upper ends of the bolts. In this way the elements of the assembly can be quickly and easily assembled and disassembled for cleaning and inspection. When the bolts 58 are loosened, the valve body 2 with its valve seat members 6 and 8 may be slipped from the slotted lower portion of the shell 24 whereupon the plunger 18 and valve member 16 may be removed from the valve body for cleaning and the chamber 34 in which the plunger 18 is located is removable and exposed for cleaning. At the same time, the solenoid 22 and its housing may remain supported in fixed position by the pipe connection or duct 48 while the valve elements are being cleaned.

The type of valve means illustrated is similar to that shown and described in the co-pending application of Kreitchman et al. Serial No. 518,604, filed June 28, 1955, now Patent No. 2,750,962. With such constructions, the valve plunger 18 is formed with a reduced end 64 having an axial bore 66 in which the valve member 16 is located. The valve member is preferably formed of a disc of material such as the fluorocarbon resin known as "Teflon" but it may be formed of graphite, stainless steel or any other suitable material. However, Teflon and graphite have relatively low specific gravities approaching that of the liquids to be controlled whereby release and movement of the sealing element upon operation of the solenoid is facilitated and frictional wear of the parts is reduced to a minimum. Moreover, the plunger 18 is preferably larger in diameter or is elongated axially of the plunger so as to provide a limited clearance between the sealing elements 16 and the bore 66 as indicated at 68. In this way, upon operation of the solenoid, the plunger 18 attains momentum before the sealing element 16 is engaged by the lower side of the bore 66. The sealing element is therefore struck a blow and may be somewhat tilted so as to break the sealing element away from the valve seat which it engages and thereby permit the sealing element to float freely within the bore 66 as the plunger 18 is raised on operation of the solenoid 22.

By positioning the valve seats 12 and 14 of the inlet and outlet members 6 and 8 in parallel and opposed relation on opposite sides of the sealing element, the sealing element is rendered responsive to variations in pressure of the fluid being controlled and is movable upon the occurrence of any back pressure in the system to engage the opposite valve seat and prevent reverse flow of fluid through the valve.

The construction provided is free of any internally exposed threads or other internally exposed crevices in which milk or sediment might accumulate to cause souring of the milk or permit the growth of bacteria or fungi. Furthermore, the elements are capable of being readily assembled and disassembled for purposes of cleaning the valve and the plunger and sealing elements may be removed from the valve body 2, the valve seat members 6 and 8, the plunger 18 and the sealing element 16 may all be removed by unloosening the bolts 58. The parts are then capable of being cleaned and sterilized if necessary. Moreover, the chamber 34 in which the plunger 18 is movable, is accessible for cleaning and presents no cavities or recesses which are inaccessible. Furthermore, by forming the body 2 of the valve of a transparent plastic material, such as Lucite, the valve may be inspected to determine whether it is, in fact, thoroughly cleaned, and when assembled, the functioning of the valve can be observed without disassembly of the parts.

Figure 4:
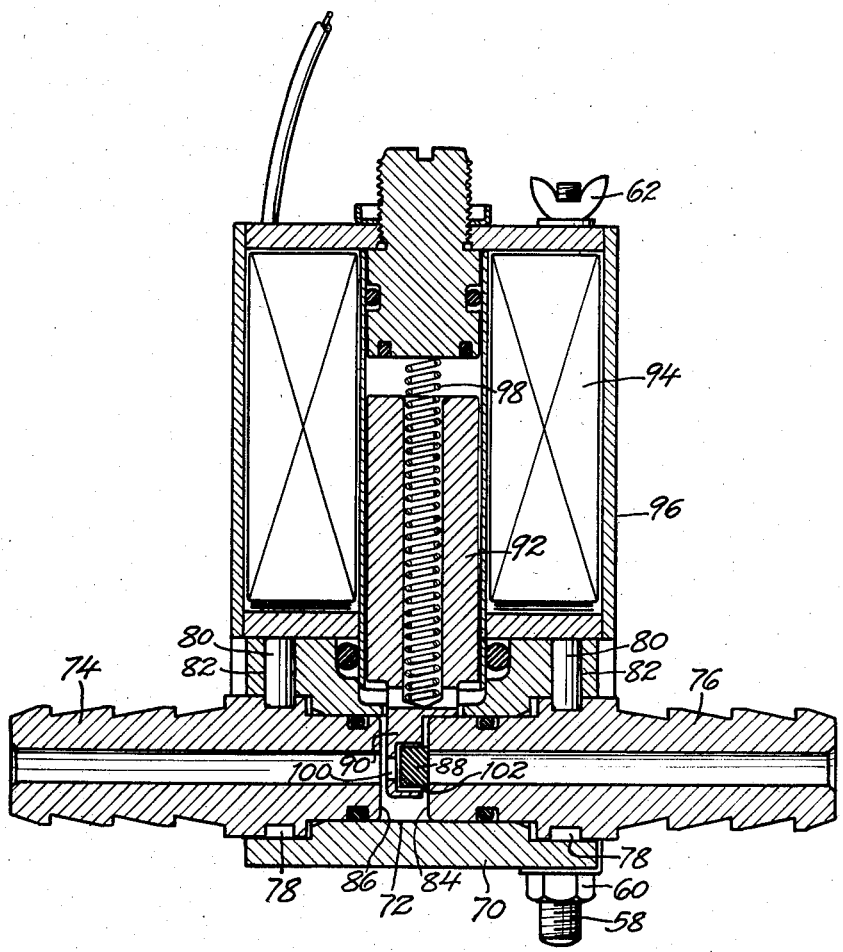
Fig. 4 is a vertical sectional view of alternative embodiment of the present invention.

In Fig. 4 there is illustrated an alternative embodiment of the invention wherein the assembly includes a valve body 70 having a bore 72 therein. An inlet member 74 and an outlet member 76 are slidably fitted into the bores 72. Each of these members is provided with an annular groove 78 and retaining pins 80 which pass through openings 82 from the upper portion of the valve body and into the annular groove to hold the inlet and outlet members securely in place. When so positioned, the valve seat 84 of the outlet member 76 is spaced from the adjacent end 86 of the inlet member 74. A valve member or sealing element 88 is carried by the reduced lower end 90 of a plunger 92 designed to be actuated by a solenoid 94 located within a housing 96. The plunger 92 is normally urged downward toward a valve closing position by a spring 98 but is movable upward when the solenoid 94 is energized to cause the valve to open.

The valve as shown in Fig. 4 is arranged within a recess in the reduced end 90 of the plunger 92 and is positioned to move slidably across the valve seat 84 of the outlet member 76. A passage 100 may extend from the recess in which the sealing element 88 is located to the opposite side of the reduced end 90 of the plunger so that the pressure of the fluid into the valve body, through the inlet member 74 will urge the sealing element 88 against the valve seat 84 enclosing the valve. As previously indicated, the sealing element 88 preferably is small in diameter in which it is located so that a clearance 102 will remain between the sealing element and the lower portion of the reduced end of the plunger, establishing a lost motion connection between the plunger and sealing element. Upon operation of the solenoid, the plunger will gain momentum before it engages the sealing element 88, and accordingly the sealing element will be struck a blow which will aid in taking the sealing element away from the valve seat in opening the valve.

While the construction shown in Figs. 1 to 3 may be considered a two-way valve, in that the sealing element is movable between two spaced valve seats so as to close the valve in the event any back pressure should develop, the construction of Fig. 4 may be considered a one-way valve since the sealing element 88 thereof is only engageable with the valve seat 84 of the outlet member 76. In either event, the valve body may be readily separated from the solenoid and its housing for purposes of cleaning or sterilizing the parts, if necessary. On the other hand, the housing 96 of the construction shown in Fig. 4 covers or conceals the retaining pins 80 by which the inlet and outlet members are held in place in the valve body. The elements are to be fixedly secured together by means of simple attaching means, such as the bolts 58, nuts 60 and wing nuts 62.

Although two alternative embodiments of the invention have been described, it will be apparent that each of the elements of the combination is capable of numerous changes and modifications in form, construction and relation. In view thereof, it should be understood that the particular embodiments of the invention shown in the drawings and described above are intended to be illustrative only and are not intended to limit the scope of the invention.

I claim:

1. A valve assembly comprising a valve body having a bore therein, a valve seat member located in said bore and having a connecting portion projecting beyond the valve body, a valve member movable into and out of sealing engagement with respect to said valve seat member, a plunger by which the valve member is carried, a solenoid surrounding the plunger for actuating the plunger and said valve member, and a housing for said solenoid having a portion extending about said valve body and into retaining engagement with said connecting portion of the valve seat member securing the valve seat member in the bore in said body.

2. A valve assembly comprising a valve body having a bore therein, a valve seat member located in said bore and having a connecting portion projecting beyond the valve body, a valve member movable into and out of sealing engagement with respect to said valve seat member, a solenoid operatively connected to the valve member for actuating said valve member, said connecting portion of the valve seat member having a groove therein, and a housing for said solenoid having a portion projecting into said groove securing the valve seat member in said bore in said body.

3. A valve assembly comprising a valve body having a bore therein, a valve seat member closely fitted within said bore and provided with a connecting portion projecting beyond the valve body, a sealing member movable with respect to the valve seat member into and out of a valve closing position, a plunger movable within an opening in the valve body and connected to the sealing member for actuating the same, said plunger having a portion projecting from the valve body, a solenoid for actuating the plunger surrounding the portion of the plunger which projects from the valve body, and a housing surrounding the solenoid and fixed in position with respect to the valve body, said housing having means thereon engaging the projecting portion of the valve seat and holding the valve seat member in place within said bore in the valve body.

4. A valve assembly comprising a valve body having a bore therein, a valve seat member slidably fitted within said bore and having a connecting portion projecting beyond said body, said body having a counter-bore therein extending at right angles to said bore, a plunger located within said counter-bore and movable therein with respect to the valve body, a valve member carried by the plunger and movable thereby into and out of sealing engagement with said valve seat member, said plunger having a portion projecting beyond the valve body, a housing surrounding the projecting portion of the plunger and held in fixed position with respect to the valve body, said housing having means thereon engaging the connecting portion of the valve seat member and securing the valve seat member in the bore in said valve body, and means in said housing for actuating said plunger.

5. A valve assembly comprising a valve body having a bore extending therethrough, a cylindrical valve seat member fitting closely within said bore and having a portion projecting from the valve body and formed with an annular groove on the outer surface thereof, said valve body having a counter-bore extending at right angles to the bore through the valve body, a plunger movable within the counter-bore and having a sealing element carried thereby and movable with the plunger and with respect to the valve seat member into and out of a valve closing position, the plunger having a portion projecting from the valve body, a solenoid surrounding the projecting portion of the plunger, a casing surrounding the solenoid and provided with a portion fitting about the valve body, said portion having a slot extending inward from an edge thereof with the sides of the slot extending into the annular groove in the projecting portion of the valve seal member and holding the valve seat member in place in said bore in the valve body.

References Cited in the file of this patent

UNITED STATES PATENTS

| | | |
|---|---|---|
| 678,014 | Merrill | July 9, 1901 |
| 2,634,757 | Houghton | Apr. 14, 1953 |
| 2,675,204 | Johnson | Apr. 13, 1954 |
| 2,699,915 | Goepfrich | Jan. 18, 1955 |
| 2,750,962 | Kreitchman et al. | June 19, 1956 |